United States Patent
Lynch et al.

(10) Patent No.: US 10,337,457 B2
(45) Date of Patent: Jul. 2, 2019

(54) ROCKET MOTOR WITH ENERGETIC GRAIN HAVING REGION WITH ENERGETIC DISPOSED THEREIN

(71) Applicant: Aerojet Rocketdyne, Inc., Sacramento, CA (US)

(72) Inventors: Michael D. Lynch, Rancho Cordova, CA (US); Richard Johnson, Rancho Cordova, CA (US)

(73) Assignee: Aerojet Rocketdyne, Inc., Rancho Cordova, CA (US)

( * ) Notice: Subject to any disclaimer, the term of this patent is extended or adjusted under 35 U.S.C. 154(b) by 0 days.

(21) Appl. No.: 15/572,535

(22) PCT Filed: Aug. 25, 2016

(86) PCT No.: PCT/US2016/048509
§ 371 (c)(1),
(2) Date: Nov. 8, 2017

(87) PCT Pub. No.: WO2017/040160
PCT Pub. Date: Mar. 9, 2017

(65) Prior Publication Data
US 2018/0156158 A1    Jun. 7, 2018

Related U.S. Application Data

(60) Provisional application No. 62/211,601, filed on Aug. 28, 2015.

(51) Int. Cl.
*F02K 9/12* (2006.01)
*B33Y 70/00* (2015.01)
(Continued)

(52) U.S. Cl.
CPC .............. *F02K 9/12* (2013.01); *B29C 64/165* (2017.08); *B33Y 10/00* (2014.12); *B33Y 70/00* (2014.12);
(Continued)

(58) Field of Classification Search
CPC ................. F02K 9/12; F02K 9/18; F02K 9/24
(Continued)

(56) References Cited

U.S. PATENT DOCUMENTS 1,274,258 A * 7/1918 Gerdom .................... F02K 9/14
                                                                     102/285
3,143,853 A    8/1964 Sobey
(Continued)

FOREIGN PATENT DOCUMENTS

RU    2499973    11/2013

OTHER PUBLICATIONS

International Search Report and Written Opinion for International Application No. PCT/US2016/048509 completed Nov. 17, 2016.
International Preliminary Report on Patentability for International Patent Application No. PCT/US2016/048509, dated Mar, 15, 2018.

*Primary Examiner* — Bret Hayes
(74) *Attorney, Agent, or Firm* — Joel G Landau

(57) ABSTRACT

A rocket motor (20) includes a nozzle (22) and a solid propellant section (24) in communication with the nozzle. The solid propellant section includes a first energetic grain layer (38, 32) that has a top surface and a bottom surface, and a second energetic grain layer (40, 44) that has a top surface and a bottom surface. The second layer is located on top of the first layer. The bottom surface of the second energetic grain layer partially abuts the top surface of the first energetic grain layer, and the bottom surface of the second energetic grain layer and the top surface of the first energetic grain layer define a region (46, 48) therebetween. A powder energetic (49) is disposed in the region.

7 Claims, 5 Drawing Sheets

(51) Int. Cl.
  *B33Y 80/00* (2015.01)
  *F02K 9/18* (2006.01)
  *C06D 5/06* (2006.01)
  *B33Y 10/00* (2015.01)
  *F02K 9/24* (2006.01)
  *B29C 64/165* (2017.01)
  *B29K 27/06* (2006.01)

(52) U.S. Cl.
  CPC ............... *B33Y 80/00* (2014.12); *C06D 5/06* (2013.01); *F02K 9/18* (2013.01); *F02K 9/24* (2013.01); *B29K 2027/06* (2013.01); *F05D 2230/31* (2013.01)

(58) Field of Classification Search
  USPC .................................. 102/285, 286, 287, 291
  See application file for complete search history.

(56) References Cited

U.S. PATENT DOCUMENTS

| | | | |
|---|---|---|---|
| 3,292,545 A | | 12/1966 | Hideo |
| 3,613,597 A | | 10/1971 | Britton et al. |
| 4,408,534 A | * | 10/1983 | Araki ...................... C06B 21/00 |
| | | | 102/285 |
| 4,860,657 A | * | 8/1989 | Steinicke .................. F42B 4/06 |
| | | | 102/334 |
| 5,578,787 A | * | 11/1996 | Kobari ................ B60R 21/2644 |
| | | | 102/288 |
| 6,167,810 B1 | * | 1/2001 | Isle ........................... F42B 5/16 |
| | | | 102/285 |
| 7,254,936 B1 | | 8/2007 | Knight |
| 8,551,268 B1 | * | 10/2013 | Yalamanchili ............ C06C 7/00 |
| | | | 149/108.2 |
| 2013/0042596 A1 | | 2/2013 | Fuller |

* cited by examiner

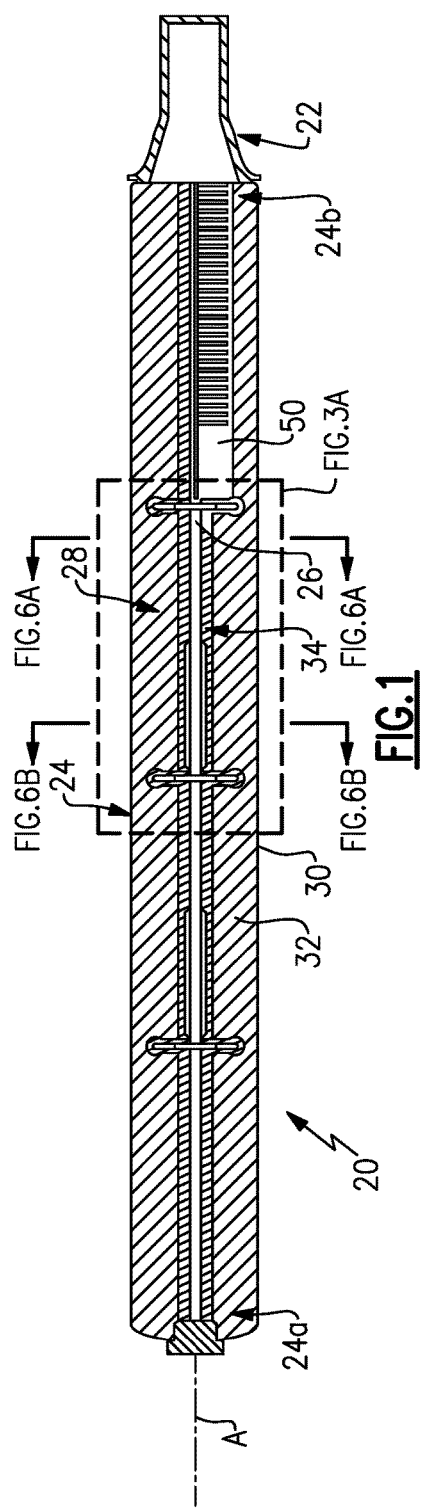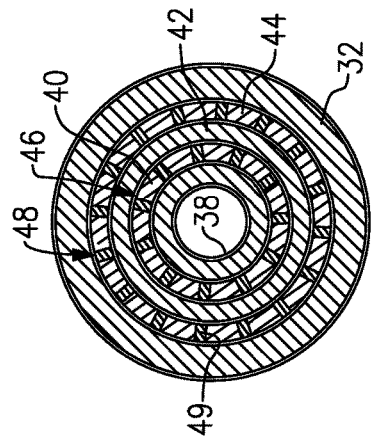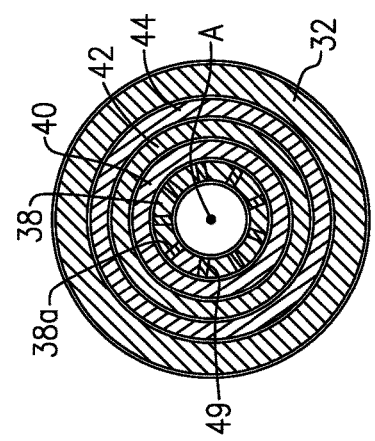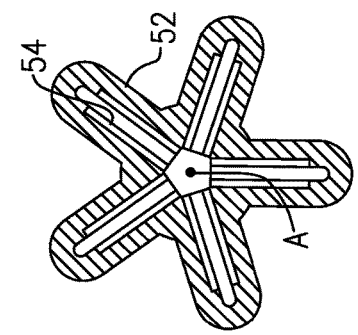

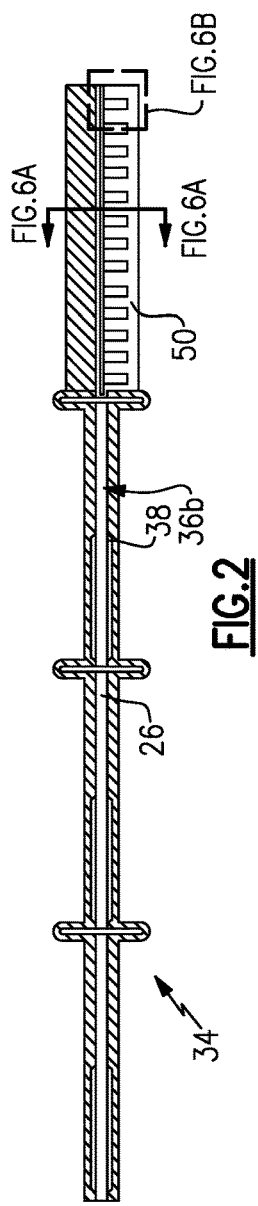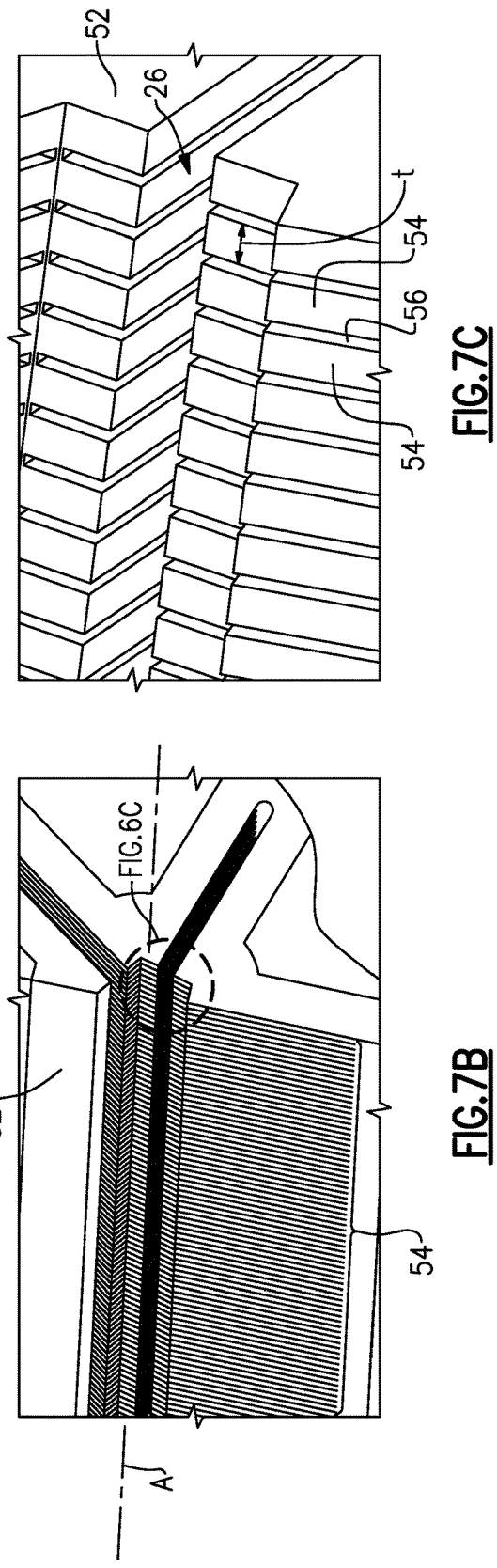

ROCKET MOTOR WITH ENERGETIC GRAIN HAVING REGION WITH ENERGETIC DISPOSED THEREIN

CROSS-REFERENCE TO RELATED APPLICATIONS

The present disclosure claims priority to U.S. Provisional Patent Application No. 62/211,601, filed Aug. 28, 2015.

BACKGROUND

This disclosure relates to solid propellant rocket motors. Such motors can include a solid propellant grain material that is cast around a core. The core is then removed by sliding it out from the cast grain material, leaving an open central bore. Ignition at the bore surface of the solid propellant generates high pressure gas, which is expelled from the bore through a nozzle to generate thrust.

SUMMARY

A solid propellant according to an example of the present disclosure includes a first energetic grain layer that has a top surface and a bottom surface. A second energetic grain layer has a top surface and a bottom surface, the second layer on top of the first layer. The bottom surface of the second energetic grain layer partially abuts the top surface of the first energetic grain layer. The bottom surface of the second energetic grain layer and the top surface of the first energetic grain layer define a region there between. A powder energetic is disposed in the region.

In a further embodiment of any of the foregoing embodiments, the region is a micro-region.

In a further embodiment of any of the foregoing embodiments, the powder energetic has a higher burn rate than the first energetic grain layer and the second energetic grain layer.

In a further embodiment of any of the foregoing embodiments, the powder energetic is a loose powder.

In a further embodiment of any of the foregoing embodiments, the powder energetic includes a powder fixed with a binder.

In a further embodiment of any of the foregoing embodiments, the powder energetic substantially fills the region.

In a further embodiment of any of the foregoing embodiments, the powder energetic partially fills the region such that there is open void space in the region.

In a further embodiment of any of the foregoing embodiments, the region is a radially elongated slot.

In a further embodiment of any of the foregoing embodiments, the first energetic grain layer includes the region and the second energetic grain layer is solid.

A process for fabricating a solid propellant according to an example of the present disclosure includes additively fabricating a first energetic grain layer having a top surface and a bottom surface, and additively fabricating a second energetic grain layer on top of the first layer. The second energetic grain layer has a top surface and a bottom surface. The top surface of the first layer partially abuts the bottom surface of the second layer. The top surface of the first layer and the bottom surface of the second layer define a region there between, and dispose a powder energetic in the region.

A further embodiment of any of the foregoing embodiments includes substantially filling the region with the powder energetic.

A further embodiment of any of the foregoing embodiments includes partially filling the region with the powder energetic such that there is open void space in the region.

In a further embodiment of any of the foregoing embodiments, the disposing includes disposing the powder energetic in the region as a loose powder.

In a further embodiment of any of the foregoing embodiments, the disposing includes disposing the powder energetic in the region as a powder fixed with a binder.

In a further embodiment of any of the foregoing embodiments, the disposing includes printing the powder energetic in the region.

A solid propellant according to an example of the present disclosure includes an energetic grain at least partially defining a region, and a powder energetic disposed in the region.

In a further embodiment of any of the foregoing embodiments, outside of the region the energetic grain excludes any of the powder energetic.

In a further embodiment of any of the foregoing embodiments, the powder energetic has a higher burn rate than the energetic grain.

In a further embodiment of any of the foregoing embodiments, the powder energetic is a loose powder.

In a further embodiment of any of the foregoing embodiments, the region has a geometric shape.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example rocket motor.

FIG. 2 illustrates an isolated view of an example of a central core of the solid propellant section of the rocket motor of FIG. 1.

FIG. 6A illustrates a cross-section of a solid propellant section taken at a first axial location.

FIG. 6B illustrates a cross-section of a solid propellant section taken at a second axial location forward of the first axial location.

FIG. 7A illustrates a cross-sectional view taken toward the aft end of a solid propellant section.

FIG. 7B illustrates a cutaway view of the aft end of the solid propellant section.

FIG. 7C illustrates a cutaway view from the location shown in FIG. 6B.

DETAILED DESCRIPTION

Figure 3A:
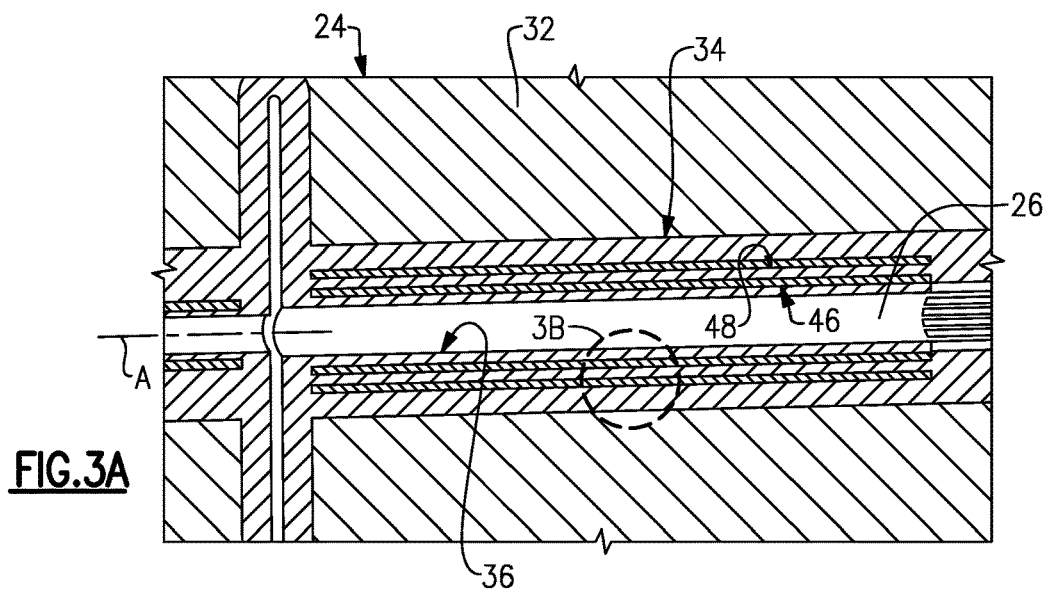
FIG. 3A illustrates a cross-section of the central core showing a multi-layer structure.

FIG. 1 schematically illustrates selected portions of a cross-section of an example rocket motor 20. The rocket motor 20 generally includes a nozzle 22 and a solid propellant section 24. As can be appreciated, the rocket motor 20 may also include additional, conventional components that are not described herein.

The solid propellant section 24 includes a forward end 24a and an aft end 24b in communication with the nozzle 22. The solid propellant section 24 includes an opening 26 along a central axis A and a solid energetic material 28 disposed within a motor case 30. The solid energetic material 28 includes an outer or outermost energetic grain layer 32 that is disposed about a central core 34. The central core 34 includes multiple layers of energetic grain material arranged around the opening 26, which is in communication with the nozzle 22.

Figure 3B:
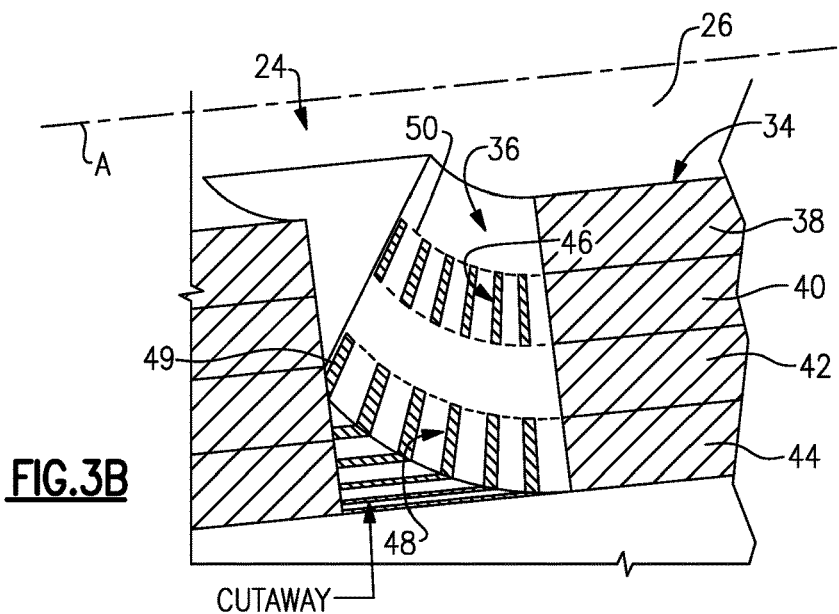
FIG. 3B illustrates a sectioned cutaway view of the central core and multi-layer structure with regions.

FIG. 2 illustrates an isolated view of the central core 34, and FIGS. 3A and 3B illustrate, respectively, a closer view of a portion of the solid propellant section 24 and a cutaway section of the solid propellant section 24. The central core 34 includes a multi-layer arrangement 36 of energetic grain layers. In this example, the arrangement 36 includes four such layers, represented at 38/40/42/44, but can alternatively include fewer layers, additional layers, or even a single layer. The layers 38/40/42/44 are arranged such that layer 38 is an inner or innermost layer with respect to the axis A, layer 44 is an outer or outermost layer, and layers 40/42 are intermediate layers. Each of the layers 38/40/42/44 has a top surface and a bottom surface. For example, the bottom surfaces face toward the central axis A and the top surfaces face away from the axis A.

The layers 38/40/42/44 can have the same composition, but in additional examples, at least one of the layers 38/40/42/44 has a different composition from at least one other of the layers 38/40/42/44. For example, the layers 38/40/42/44 may have different amounts of inert material to provide different reaction rates to generate gas and tailor gas velocities for short durations, or the layers 38/40/42/44 may have different types or amounts of energetic material with burn rates that differ from one another or that differ from the outermost energetic grain layer 32 that is disposed about a central core 34.

As shown, layer 40 and layer 44 include, respectively, a plurality of regions 46 and plurality of regions 48. In this example, layers 38 and 42 are solid layers that do not contain any regions. Layer 38 and layer 40 meet each other at an interface 50. The regions 46 at the interface 50 decouple the layer 40 from the layer 38. That is, the layers 38 and 40 only partially conform with each other because of the discontinuity provided by the regions 46. Similarly, layer 38 is also decoupled with respect to layer 42, and layer 44 is decoupled with respect to layer 42. Thus, as used in this disclosure, any two of these decoupled layers can be considered to be first and second decoupled layers, regardless of their position in the multi-layer arrangement 36. Alternatively, although layers 40 and 44 are shown with the regions 46 and 48, it is to be understood that this disclosure is not limited to such an arrangement and that layers 38 and/or 42 could alternatively have regions, or could additionally have voids or micro-voids in a different pattern than an adjacent layer.

A powder energetic 49 is disposed in the regions 46 and 48. The energetic grain layers 38/40/42/44 outside of the regions 46 and 48 may exclude any of the powder energetic 49. That is, the powder energetic 49 may be concentrated only in the regions 46 and 48 rather than being uniformly distributed through one or more of the layers 38/40/42/44. The burn rate and/or thrust generated from the powder energetic 49 can be tailored via selection of the composition. For example, the powder energetic 49 has a higher burn rate than at least the energetic grain layers 40 and 44. The higher burn rate may be achieved by using a different, higher energy energetic material than the energetic grain layers 40 and 44 or by using different proportions of constituents in the same energetic material as for the energetic grain layers 40 and 44. In further examples, the composition of the powder energetic 49 is selected for compatibility with the composition of at least the immediately surrounding grain layer or layers. For instance, the compositions are chemically compatible to be non-reactive with each other, to have low inter-diffusion, to have approximately equal hardness, to have approximately equal thermal expansion, or combinations of such features.

Figure 4A:
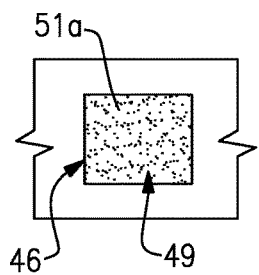
FIG. 4A illustrates a region with a loose powder.
Figure 4B:
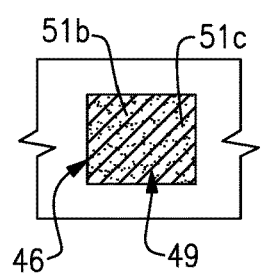
FIG. 4B illustrates a region with a bonded powder.
Figure 4C:
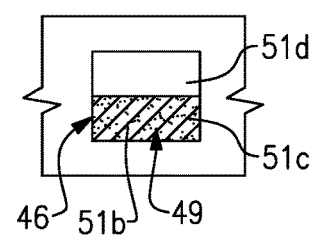
FIG. 4C illustrates a region that is partially filled with a powder energetic to leave an open void space.

In the example shown in FIG. 4A, the powder energetic 49 is a loose powder 51a that substantially fills the region 46 (or 48). In an alternative example shown in FIG. 4B, the powder energetic 49 includes a powder 51b fixed with a binder 51c, and the powder energetic 49 substantially fills the region 46. In an alternative example shown in FIG. 4C, the powder energetic 49 only partially fills the region 46 such that there is open void space 51d in the region 46.

The regions 46 and 48 can be geometric features that are purposely and non-randomly fabricated into the layers 40 and 44. In this example, the regions 46 and 48 are radially elongated shapes that are longer in the radial direction than they are wide in the circumferential direction. The regions 46 and 48 are generally small in size and may have a predetermined geometry. As a further example, the all or a portion of the regions 46 and 48 may be micro-regions. As used herein, the term "micro-region" refers to an enclosed volume that has at least one distinct dimension that is approximately 1000 micrometers or less. To further modify the surface area, the micro-regions may more typically have at least one distinct dimension that is less than 500 micrometers or that is less than 100 micrometers. In this example, at least the circumferential dimension of the slots is less than 500 micrometers.

The slots are uniformly circumferentially-spaced around the axis A. Such a slot geometry can facilitate the increase of surface area of the layers 40/44 for controlled burn rate during operation of the rocket motor 20, as will be described in further detail below. In other examples, the regions 46/48 can have other non-random, geometric shapes, such as but not limited to cylindrical, oblong, tapered, stepped, polygonal, and honeycomb, in order to facilitate tailoring the amount of surface area for burning. Additionally, the regions 46/48 can be provided in other non-random patterns in one or more of the layers.

The surface areas of the layers 38/40/42/44 are tailored to provide increased or decreased rates of consumption or burning for controlling generated gas velocity. For example, the regions disclosed herein can be provided in one or more layers to provide higher surface area in correspondence with a lower core temperature phase of burn. Lower surface area, from the absence of any of the regions or different geometry regions, can be provided in correspondence with a higher core temperature phase of burn, to reduce the effect of increasing burn rate with increasing temperature. Thus, the geometry of each of the layers 38/40/42/44 can be selected with respect to the presence or not of regions, with respect to the geometry of the regions, and with respect to the composition of the powder energetic 49, to tailor burn rate of the particular layer.

Figure 5A:
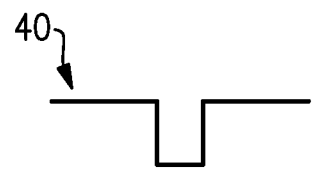
FIGS. 5A-5E illustrates different geometries of surface features.
Figure 5B:
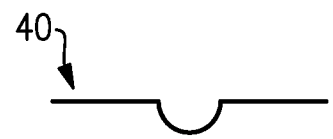
Figure 5C:
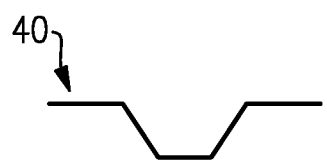
Figure 5D:
Figure 5E:
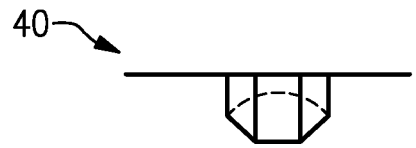

The regions 46/48 may be formed, at least in part, by one or more surfaces features on the bottom surface of one or more of the layers 38/40/42/44. As can be appreciated, the surface features can be designed such that the shape of the regions 46/48 differ. FIGS. 5A, 5B, 5C, 5D, and 5E show examples of modified layer 40 with different surface feature protrusions. In FIG. 5A, the surface feature protrusion is a rib or stud. I5 FIG. 4B, the surface feature protrusion is a bump. In FIG. 5C, the surface feature protrusion is a trapezoid. In FIG. 5D, the surface feature protrusion is an ellipsoid, and in FIG. 5E the surface feature protrusion is a honeycomb. Likewise, negatives of any of the protrusions could additionally or alternatively be used.

In addition to decoupling the layers 38/40/144, the regions 46/48 also enable the mechanical properties of the outer or outermost energetic grain layer 32 to be relaxed. For instance, regions that are parallel to the interface serve for stress relief such that the decoupling permits the outer or outermost energetic grain layer 32 to shrink outwards with less restraint from the central core 34. As a result, the outer or outermost energetic grain layer 32 can have a lower modulus and higher strain to failure, and the potential for cracking at the interface may be reduced. The powder energetic 49 can also be used as a structural reinforcement in the regions 46/48, to ultimately provide greater structural support of the outermost energetic grain layer 32 and/or surrounding grain layers, thus further enabling the mechanical properties of those layers to be relaxed.

FIGS. 6A and 6B show cross-sections taken at different axial positions (see FIG. 1) along the solid propellant section 24. Although the geometry of the layers 38/40/42/44 may be constant along the full axial length of the central core 34, the geometries in this example vary axially. For example, FIG. 6A shows the geometry that corresponds to the cutaway shown and described with respect to FIG. 3B, wherein the layers 40 and 44 have the regions 46 and 48. However, at the axial location shown in FIG. 6B, layers 40 and 44 do not have any regions and, instead, only layer 38 has regions 38a at this location. Thus, not only can the surface recession of one layer to another of the layers 38/40/42/44 be tailored, but sections of each layer 38/40/42/44 can be individually tailored along the axial length by selectively providing regions to control the amount of surface area available for burning and burn rate via the powder energetic 49 in that section. For instance, the layers 38/40/42/44 can be tailored to initially burn and open a larger volume toward the aft end 24b to provide a greater flow area for gas generated by subsequently ignited, upstream portions of the layers to maintain flow velocity within desired limits. The gas flow otherwise may have higher potential to choke and/or accelerate to velocities that can increase erosive burning to an undesirable level.

FIG. 7A shows a cross-section taken through an aft portion of the central core 34. FIG. 7B shows a cross-sectional cutaway view and FIG. 7C shows a closer view. At this location, the central core 34 has a "star" cross-sectional configuration and includes an inner energetic grain layer 52 with a section that is aft of the regions 46/48 with respect to proximity to the nozzle 22. The layer 52 includes a group of protrusions 54 that are axially-spaced along the central axis A. The protrusions 54 increase the surface area in this section of the central core 34. In this example, the protrusions 54 are axially-spaced fins that each have a uniform axial thickness, represented at "t." The fins are axially-spaced apart by open slots 56, which are also of uniform axial thickness and can also be considered to be regions. The fins and slots provide relatively uniform access to, or exposure of, the surfaces for reaction to generate gas. As can be appreciated given this disclosure, the protrusions 54 could alternatively have a different geometry pattern that is selected to provide a desired surface area and exposure, subject to the ability to fabricate such geometry.

The protrusions 54 provide a high surface area at the aft end 24b. Upon ignition, the protrusions 54 are relatively rapidly consumed or burned at a higher rate than other, upstream sections of the central core 34. Thus, the aft end 24b of the opening 26 toward the nozzle 22 becomes enlarged to provide a greater flow area for gas generated by subsequently ignited, upstream layers and to maintain flow velocity within desired limits. The gas flow otherwise may have higher potential to choke and/or accelerate to velocities that can increase erosive burning.

In a further example, the protrusions 54 are micro-geometry protrusions. For instance, the periphery of each protrusion 54 has at least one distinct dimension that is 1000 micrometers or less. However, to increase surface area, the protrusions 54 may more typically have at least one distinct dimension that is less than 500 micrometers or that is less than 100 micrometers. In the example of the fins, the axial thickness "t" is less than 500 micrometers, or less than 100 micrometers.

The tailoring of the surface areas of the layers herein may be used to maintain a surface area that is sufficiently high to provide a required mass flow, and thus thrust. For example, when a layer burns out, the next layer may have a tailored surface area to provide adequate mass flow (thrust) while keeping within acceptable combustion-driven limits. The surface areas may also be tailored to keep the gas velocity low enough to avoid erosive burning or choking. For instance, the initial enlargement of the aft end of the opening 26 from burn of the protrusions 54 can be used to maximize the surface area as far aft as possible early in the burn. Surface area of subsequent layers can be tailored to progressively enlarge the opening 26 moving forward to control gas flow to be within desired velocities. Additionally, by providing a large portion of the boost thrust via the central core 34, the burn rate of the (main) outer or outermost energetic grain layer 32 may be better tailored to a "sustain" phase of the rocket motor 20.

The central core 34 can additionally serve to encapsulate the outer or outermost energetic grain layer 32 between the structural case 30 and the central core 34. The encapsulation may permit the reduction or elimination of free and unsupported inner surfaces of the outer or outermost energetic grain layer 32. Thus, under hot conditions the central core 34 can support the outer or outermost energetic grain layer 32 and reduce or prevent sagging (creep). Under cold conditions the central core 34 can serve for stress relief as described above.

Also disclosed is a process for fabricating the central core 34 and solid propellant section 24 of the rocket motor 20. For example, the process includes additively fabricating the layers described herein. The central core 34 is then installed into the motor case 30, and the outer or outermost energetic grain layer 32 is then cast around the additively fabricated energetic grain layer or layers.

The additive fabrication, which may also be referred to as additive manufacturing or three-dimensional printing, can include an additive slurry technique or a powder technique. In the slurry technique, a slurry is fed under pressure to a heated nozzle.

Figure 8:
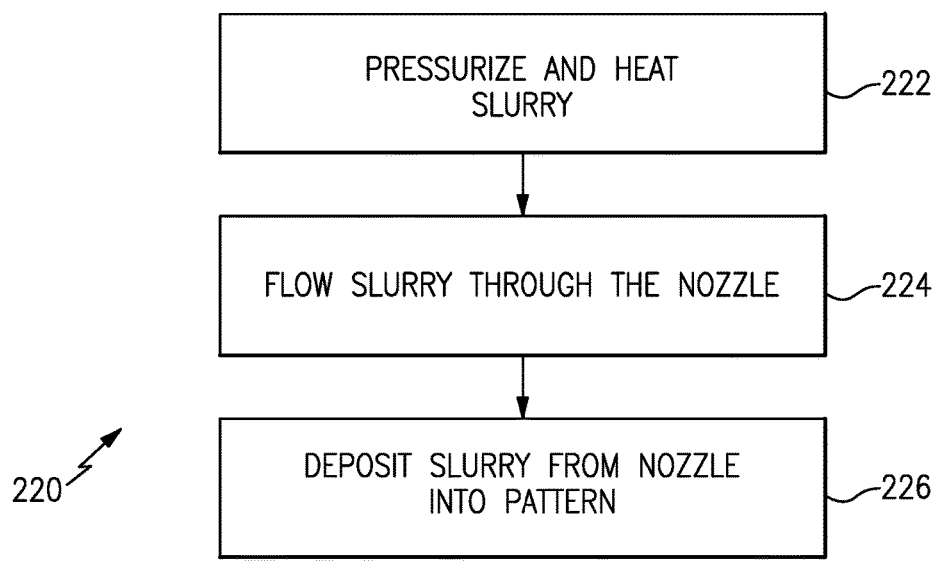
FIG. 8 illustrates an example additive manufacturing process.
Figure 9:
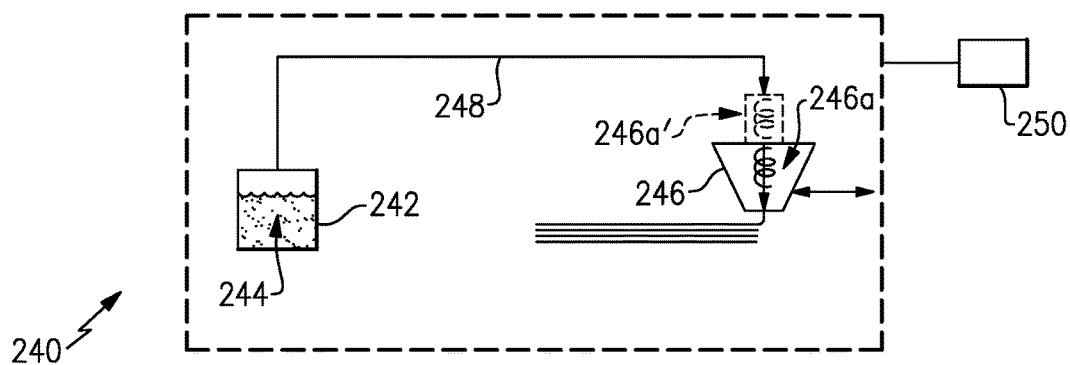
FIG. 9 illustrates an example system for performing the process of FIG. 8.

FIG. 8 illustrates an example additive manufacturing process 220 using a slurry technique and FIG. 9 depicts an example system 240 for performing the process 220. The process 220 can be used to form, or "print," solid energetic materials to make the central core 34.

The process 220 is described with respect to steps 222, 224, and 226, and the system 240. Additional processing steps may be used prior to, in between, or subsequent to the steps 222, 224, and 226. Generally, the system 240 includes a vessel 242 that holds a slurry 244, a nozzle 246 for dispensing the slurry 244, and one or more lines 248, such as pipes or tubes, through which the slurry 244 moves from the vessel 242 to the nozzle 46. The nozzle 246 may include a heating block 246a. Alternatively or additionally, the heating block 246a may be located adjacent to and upstream of the nozzle 246, as shown at 246a'. The vessel 242, the line 248, and the nozzle 246 may include one or more valves, one or more pumps, or the like for moving the slurry 244. The system 240 may include multiple vessels 242 that hold different compositions of slurries 244 and multiple nozzles 246 for depositing grain layers and the powder energetic with different compositions. A controller 250 is in communication with at least the nozzle or nozzles 246 and may also be in communication with the vessel or vessels 242, the lines 248, heating block or blocks 246a/246a', and any valve(s) or pump(s), to control operation of the system 240. In this regard, the controller 250 includes hardware, such as a micro-processor, software, or both, that are configured and/or programmed to carry out the process 220.

For printing a solid energetic material and the powder energetic, such as the central core 34, the slurry or slurries 244 can include a mixture of a plastisol and solid energetic material. A plastisol is a mixture or suspension of polymeric particles in a liquid plasticizer. For instance, the plasticizer includes phthalates, adipates, or combinations thereof. Phthalates can include, but are not limited to, diisononyl phthalate (DINP), diisodecyl phthalate (DIDP), and di-2-ethylhexyl phthalate, and adipates can includes, but are not limited to, dioctyl adipate (DOA) and dioctyl sebacate (DOS). For example, the plastisol includes polymeric particles of at least one of polyvinyl chloride or nitrocellulose and a liquid plasticizer. The solid energetic material and powder energetic also include energetic powder particles that are mixed with the plastisol.

The solid energetic material and powder energetic is selected according to the desired end use requirements. For example, the solid energetic material and the powder energetic can include, but are not limited to, metallic fuels, oxidizers, and fuel/oxidizer blends. The solid energetic material and/or powder energetic may also include one or more inert binders, burn modifiers, stabilizers, and the like. In one example, the slurry or slurries 244 may include, by weight, approximately 7.5% of polyvinyl chloride, approximately 7.5% of a plasticizer, and approximately 85% of the energetic powder particles. In a further example, the energetic powder particles include, by weight, approximately 18% of metallic fuel.

Turning again to the process 220, at step 222 the slurry is pressurized and heated. The slurry 244 is pressurized to facilitate flow from the vessel 242 through the line 248 to the nozzle 246. For example, the slurry 244 is pressurized in the vessel 242 at approximately 20 to 500 pounds per square inch. The slurry 244 is then fed under this pressure from the vessel 242 to the nozzle 246. The pressurization also facilitates suppression of curing prior to the nozzle 46 to reduce "globbing." In one further example based on the slurry composition described above that includes at least one of polyvinyl chloride or nitrocellulose, dioctyl adipate, and energetic powder particles, the slurry 44 has a viscosity that is less than 20 kilopoise, is pressurized in the vessel 242 at approximately 30 to 40 pounds per square inch, and is heated to approximately 170 to 220° F.

The slurry 244 may be at substantially ambient temperature until the heating. In this regard, in one example, the process 220 includes heating the slurry 244 in the nozzle 246 via the heating block 246a. Alternatively, if the heating block 246a' is used, the slurry 244 is heated prior to the nozzle 246. The slurry 244 may be fully uncured or substantially fully uncured prior to being heated. At the proper temperature and pressure, the heating commences solvation of the polymeric particles (e.g., polyvinyl chloride) by the liquid plasticizer.

At step 224 the pressurized heated slurry 244 flows through the nozzle 246, and at step 226 the slurry 244 is deposited from the nozzle 246 in a predetermined pattern. Although the slurry 244 is pressurized and heated to the appropriate temperature at the heating block 246a or 246a' of the nozzle 246, the slurry 244 may reach a substantially fully cured or hardened state after being dispensed from the nozzle 246 and cooled. For instance, depending on the flow of the slurry 244, solvation and curing may begin in the nozzle 246 or after dispensing from the nozzle 246. In one example, heating to a temperature equal to or greater than a cure temperature of the slurry commences solvation of the polymeric particles by the liquid plasticizer and thus initiates curing and hardening of the slurry 44.

The predetermined pattern may be a computerized pattern of the central core 34, including the regions and powder energetic. In this regard, the nozzle or nozzles 246 move back and forth to selectively deposit the slurry or slurries 244 in the computerized pattern. Additionally or alternatively, the substrate on which the slurry or slurries 244 are dispensed can be moved according to the computerized pattern. Multiple layers of the slurry or slurries 244 can be selectively deposited on one another to build-up the central core 34 in accordance with the computerized pattern.

In further examples, the nozzle 246 is also designed or selected with respect to the slurry composition. For instance, since the slurry 244 contains polymeric particles and energetic powder particles, the dispensing orifice of the nozzle 246 through which the slurry 244 is deposited is at least as large as the largest particles in the composition. More typically, the orifice may be at least several times larger than the largest particles in the composition, to reduce bridging and plugging of the nozzle 246. For instance, the nozzle orifice can be, but is not limited to, 1/64 to 3/64 inches.

In a further example, the composition of the slurry 244 is selected with respect to the amount of heating provided at the heating block 246a or 246a'. For instance, the slurry composition has a ratio, by weight, of 80:20 to 20:80 with respect to the amount of polyvinyl chloride and/or nitrocellulose to the amount of dioctyl adipate. In a further example, the ratio is 60:40 to 40:60.

The pressure fed slurry feed to a heated nozzle may also be integrated into a conventional three dimensional printing machine (e.g., one from Stratsys or Makerbot). In particular, the filament feed system of such a conventional printing machine may be replaced with the pressure fed slurry feed to a heated nozzle. This approach provides for printing of solid energetic materials in controlled geometries, such as with the protrusions described herein.

In the powder technique, a powder of the solid energetic material and powder energetic are selectively deposited in a relatively thin layer, followed by deposition of a layer of liquid bonding agent, such as plasticizer and PVC. The liquid bonding agent may be applied only to the solid energetic material if the powder energetic is to be the loose powder. While loose powder would normally be removed in such a process, the loose powder of the powder energetic is not removed prior to depositing the next layer, so that the powder energetic remains as a loose powder in the end product. If the powder energetic is bonded, the liquid bonding agent is also applied to the powder energetic. The bonding agent infiltrates the powder and then solidifies to hold the powder layer in place. The deposition of powder and bonding agent can be repeated over selected areas to provide a desired thickness and geometry. This approach also provides for printing of solid energetic materials and the powder energetic in controlled geometries, such as with the protrusions and regions described herein. Such geometries are not possible using conventional casting around a core. If a core were to include such features it would interlock with the cast grain material, preventing the core from being removed without destroying the geometry of the cast grain material. The powder technique can alternatively or additionally be integrated into known powder-color printing systems.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A solid propellant, comprising:
   a first energetic grain layer having a top surface and a bottom surface;
   a second energetic grain layer having a top surface and a bottom surface, the second layer on top of the first layer, wherein the bottom surface of the second energetic grain layer partially abuts the top surface of the first energetic grain layer, wherein the bottom surface of the second energetic grain layer and the top surface of the first energetic grain layer define a region there between; and
   a powder energetic disposed in the region, wherein the powder energetic is a loose powder.

2. The solid propellant as recited in claim 1, wherein the region is a micro-region.

3. The solid propellant as recited in claim 1, wherein the powder energetic has a higher burn rate than the first energetic grain layer and the second energetic grain layer.

4. The solid propellant as recited in claim 1, wherein the powder energetic substantially fills the region.

5. The solid propellant as recited in claim 1, wherein the powder energetic partially fills the region such that there is open void space in the region.

6. The solid propellant as recited in claim 1, wherein the region is a radially elongated slot.

7. The solid propellant as recited in claim 1, wherein the first energetic grain layer includes the region and the second energetic grain layer is solid.

* * * * *